(12) United States Patent
Bourdet et al.

(10) Patent No.: US 8,177,020 B2
(45) Date of Patent: May 15, 2012

(54) CONTROL DEVICE FOR THE ACTIVE STEERING OF A VEHICLE

(75) Inventors: Jean-Marie Bourdet, Gif sur Yvette (FR); Guy Le Trouher, Le Perreux sur Marne (FR); Olivier Pape, Montesson (FR)

(73) Assignee: Nexter Systems, Roanne (FI)

( * ) Notice: Subject to any disclaimer, the term of this patent is extended or adjusted under 35 U.S.C. 154(b) by 274 days.

(21) Appl. No.: 12/453,883

(22) Filed: May 26, 2009

(65) Prior Publication Data

US 2009/0288892 A1 Nov. 26, 2009

(51) Int. Cl.
*B62D 11/02* (2006.01)
(52) U.S. Cl. .......................... 180/446; 180/444
(58) Field of Classification Search .................. 180/444, 180/446, 443, 415, 421
See application file for complete search history.

(56) References Cited

U.S. PATENT DOCUMENTS

| 5,703,775 | A | * | 12/1997 | Yamamoto et al. | 701/41 |
| 6,655,494 | B2 | * | 12/2003 | Menjak et al. | 180/446 |
| 7,063,636 | B2 | | 6/2006 | Augustine | |
| 7,306,535 | B2 | * | 12/2007 | Menjak et al. | 475/29 |
| 7,490,682 | B2 | * | 2/2009 | Witzenberger | 180/9.1 |
| 2008/0087491 | A1 | | 4/2008 | Ammon et al. | |

FOREIGN PATENT DOCUMENTS

| DE | 10 2005 007 307 A1 | 8/2006 |
| EP | 1 548 411 A2 | 6/2005 |
| WO | WO 2005/100130 A1 | 10/2005 |

* cited by examiner

*Primary Examiner* — Tony Winner
(74) *Attorney, Agent, or Firm* — Oliff & Berridge, PLC

(57) ABSTRACT

A control device for the active steering of a vehicle comprising a driving differential that is positioned between a steering wheel and steering control means, said differential which furthermore receives at a first input a counter-steering command supplied by a turn correction motor, wherein said steering wheel is linked to a second input of said differential by non-return means preventing any force feedback from said differential to said steering wheel.

7 Claims, 4 Drawing Sheets

CONTROL DEVICE FOR THE ACTIVE STEERING OF A VEHICLE

BACKGROUND OF THE INVENTION

1. Field of the Invention

The technical scope of the invention is that of devices enabling the control of an active steering system.

2. Description of the Related Art

Active steering systems are organs to steer a vehicle that enable a turn command given by the driver to be corrected when this command risks compromising the vehicle's stability.

Thus, a device is known by patent FR-2681449 in which a computer evaluates a potential oversteering set point based on a measurement of the angular yaw speed and determines a counter-steering set point that is applied to the steering organ to correct the steering lock.

This correction is more often than not made by a mechanical differential. Indeed, such equipment enables a set point command (for example, given by a steering wheel) to be combined with a correction command given by a motor that is piloted by the computer as a function of the roll measurements that are made.

U.S. Pat. No. 7,063,636 discloses such an active steering device in which the steering wheel acts on the input of a differential whereas an electric motor to correct the steering lock acts on the planet carrier of the differential.

With such a device, piloting is still possible even in the event of the failure of the correction motor. There is, in fact, a direct link via the differential between the steering wheel and the output controlling the wheels.

However, such a device is associated with hydraulic power steering that to a certain extent compensates for the shocks or force feedback that might be communicated to the steering wheel when the compensation motor is started up.

Such an active steering device is not always implemented, namely in vehicles employing skid driving or skid steering vehicle, such as tracked vehicles or non-drive wheel vehicles.

In fact, in these vehicles the steering control is amplified using specific means formed of the hydrostatic steering unit. These means are positioned downstream of the steering differential and are not able to dampen the shocks caused by the steering correction motor.

SUMMARY OF THE INVENTION

The aim of the invention is to propose an active steering control device that enables the direct control of the steering to be made by a steering wheel, even in the event of the failure of the correction motor.

The device according to the invention thereby prevents a shock feedback to the steering wheel despite the absence of a hydraulic power steering mechanism.

The invention is thus more particularly applicable to the steering control of tracked or non-drive wheeled vehicles.

Thus, the invention relates to a control device for the active steering control, device comprising a driving differential that is positioned between a steering wheel and steering control means, differential which furthermore receives at a first input a counter-steering command supplied by a turn correction motor, device wherein the steering wheel is linked to a second input of the differential by non-return means preventing any force feedback from the differential to the steering wheel.

According to a first embodiment, the non-return means comprise a system with pinion and worm positioned between the steering wheel and the second input of the differential.

According to a second embodiment, the non-return means comprise a screw-nut system coupled with a rotary/linear motion converter such as a crank-connecting rod system.

According to a third embodiment, the non-return means comprise a transfer gearbox comprising an idler shaft with two pinions, a first pinion being coupled with the steering wheel and the second pinion being coupled with the second differential input, the idler shaft being able to be activated additionally by a counter-torque motor activated by the control computer.

Advantageously, the counter-torque motor will be linked to the idler shaft by means of damping means.

The counter-torque motor may be linked to the idler shaft by means of a calibrated break coupler.

According to a variant of the invention, the device may comprise power cut braking means positioned between the first input and the turn correction motor.

BRIEF DESCRIPTION OF THE DRAWINGS

The invention will become more apparent from the following description of different embodiments, such description being made with reference to the appended drawings, in which.

DETAILED DESCRIPTION OF PREFERRED EMBODIMENTS

Figure 1:
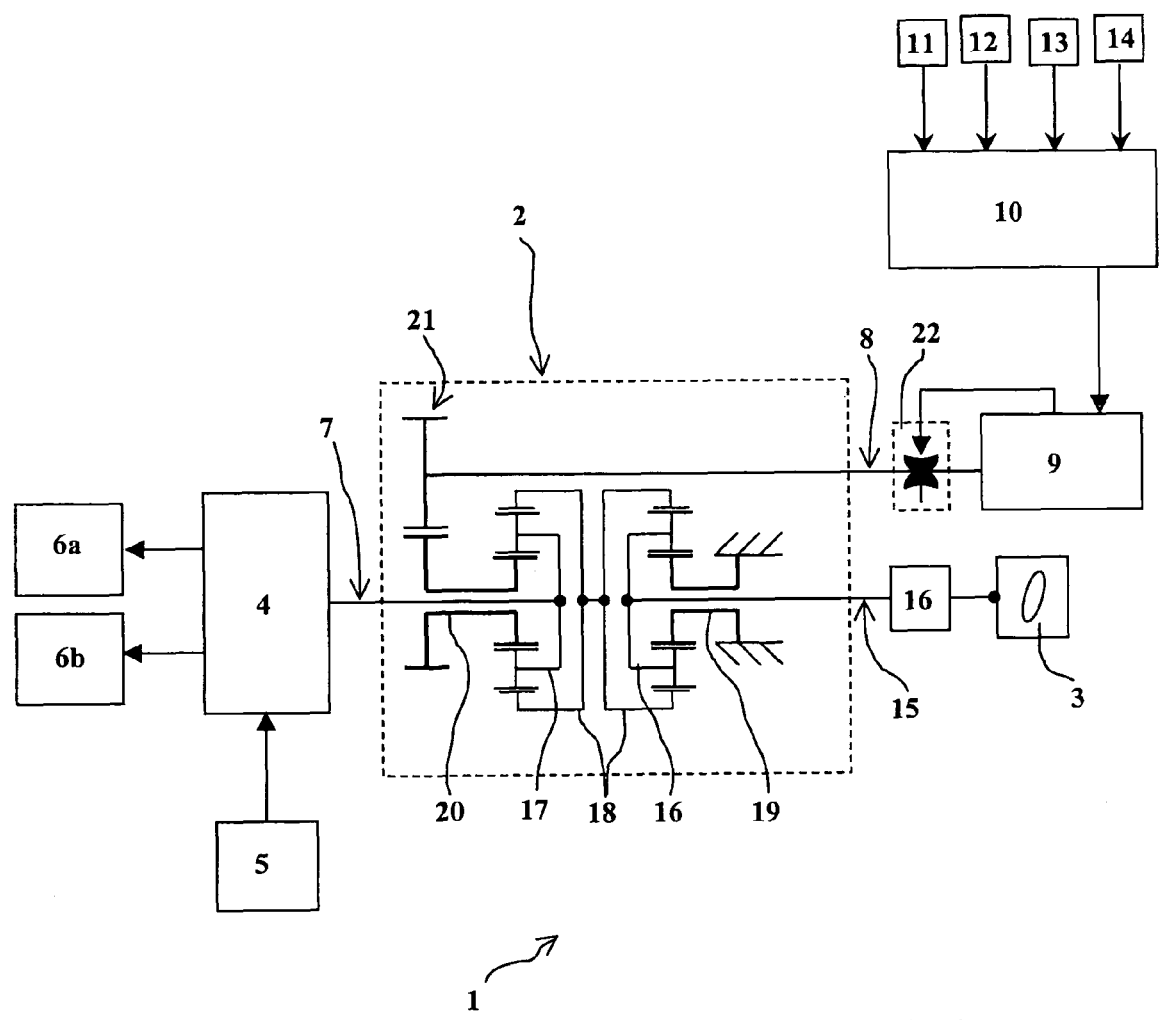
FIG. 1 is a general kinematic diagram of a device according to the invention.

FIG. 1 shows an active steering control device 1 according to the invention.

This device comprises a driving differential 2 positioned between a steering wheel 3 and steering control means 4.

The vehicle in question is here a skid steered vehicle (tracked vehicle or non-drive wheel vehicle). The steering control means 4 is thus a hydrostatic steering control unit Such a steering control unit is well known. It uses the power of a heat engine 5 to generate the speed differential between a right track 6a and a left track 6b (or right wheel train and left wheel train for a vehicle with non-drive wheels). The output shaft 7 of the driving differential 2 supplies the skid set point.

The unit 4 is not the subject of the present invention and thus requires no additional explanation.

The steering set point supplied by the device 1 is thus used by the unit 4 to control the skid steering.

The device 1 may be implemented to command a steering lock of wheels implementing more conventional command means 4, such as a steering rod acting on driving wheels.

At a first input 8, the differential 2 receives a counter-steering command from the turn correction motor 9. This motor 9 is controlled by a computer 10 that uses the signals supplied by sensors 11, 12, 13, 14. These sensors may comprise a gyrometer 11 supplying the instantaneous angular speed of the vehicle, and accelerometers or strain gauges 12, 13, 14 enabling the force feedback exerted by the ground on the mobility means to be measured (thereby also enabling road grip to be measured).

The processing of these different signals to deduce a counter-steering set point is disclosed in patent FR2681449 and thus requires no further explanation here.

The steering wheel 3 is furthermore linked to a second input 15 of the differential 2 by means of non-return means 16 preventing force feedback from the differential 2 to the steering wheel 3.

FIG. 1 shows the internal architecture of the differential 2. We see that the second input 15 is linked to a first planet carrier 16 whereas the output 7 is linked to a second planet carrier 17. The two planet carriers mesh on the crown gear 18 and the reduction ratio between the input 15 and output 7 is thus, in principle, 1:1 when the two sun gears 19 and 20 are immobile.

The first sun gear 19 is integral with the casing of the differential 2.

The second sun gear 20 is driven in rotation by the counter-steering motor 9 by means of the first input 8 that is linked to a pinion 21 meshing on the second sun gear 20.

The steering set point given by the differential 2 is thus a set point that is corrected by the counter-steering motor 9 taking into account the measurements of road grip and the behavior of the vehicle made using a computer 10 (having been programmed appropriately).

We note that in FIG. 1 a brake 22 is positioned between the counter-steering motor 9 and the first input 8.

This brake 22 is a power cut brake. It ensures that the first input 8 is blocked when the motor 9 is no longer powered (for example, further to an electric incident). In the event of a failure of motor 9, such an arrangement prevents steering wheel 3 from being able to command the pivoting of the motor 9 shaft rather than the output shaft 7.

By way of a variant, it would be possible for the power cut brake 22 to be replaced by a non-return means such as a screw-nut link.

In accordance with the invention, the steering wheel 3 is thus linked to the second input 15 of the differential 2 by means of the non-return means 16. Such means prevents force feedback from the differential 2 to the steering wheel 3.

Such force feedback mainly occurs during shocks caused by the counter-steering motor 9 starting up.

Several embodiments of these non-return means will now be described with reference to FIGS. 2 to 4.

Figure 2:
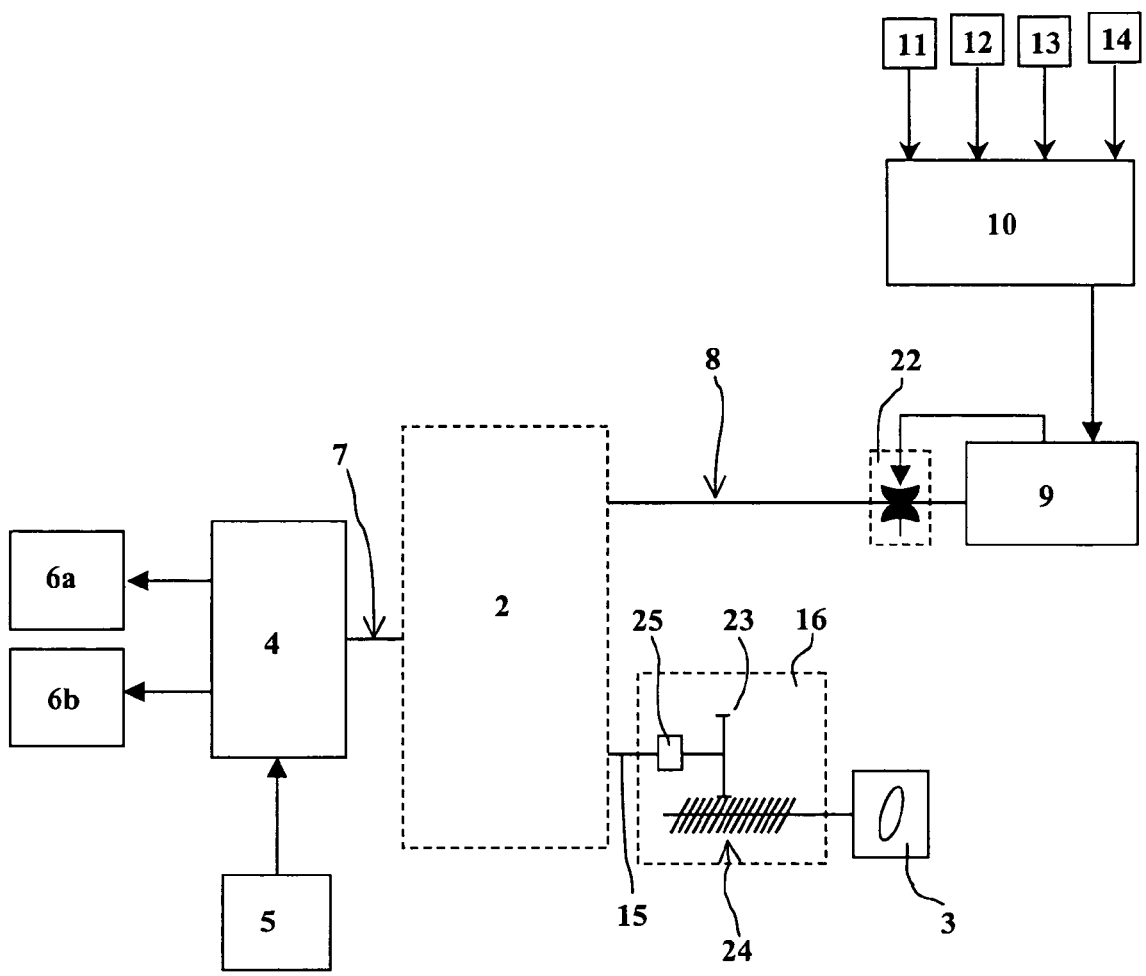
FIG. 2 is a simplified diagram of a first embodiment of the invention.

FIG. 2 shows a first embodiment in which the non-return means 16 comprise a system associating a pinion 23 integral with the second input 15 and a worm 24 integral with the steering wheel 3.

The parasite torques received by the pinion 23 are stopped at the worm 24 thanks to the irreversibility of this assembly. Damping means 25 may furthermore be provided positioned between the second input 15 and the pinion 23, for example a torque shaft. Such an arrangement will enable any shocks to be damped and will limit any caulking or mechanical deterioration of the pinion 23 and worm 24.

A reduction assembly (not shown) may furthermore be provided between the pinion 23 and the second input 15 so as to limit the reduction of the pivoting angle caused by a pinion/worm assembly.

Figure 3:
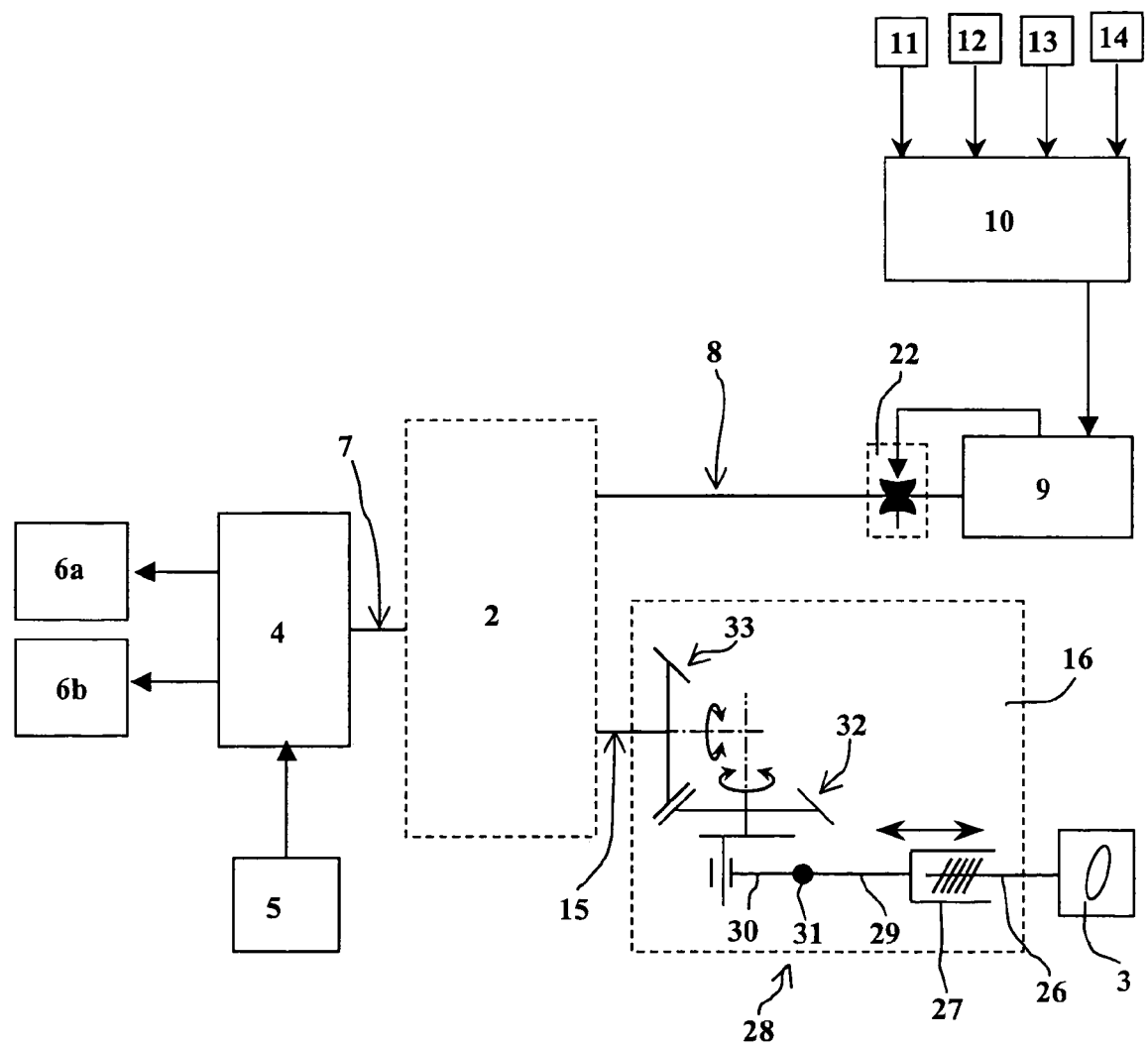
FIG. 3 is a simplified diagram of a second embodiment of the invention.

FIG. 3 shows a second embodiment in which the non-return means 16 comprise a system associating a screw 26 integral with the steering wheel 3 and a nut 27. The nut 27 drives a linear/rotary motion converter 28 of the crank-connecting rod type.

This converter 28 comprises a set of slave connecting rods 29, 30; hinged at 31, and pivoting a conical pinion 32. The conical pinion 32 meshes on an orthogonal pinion 33 integral with the second input 15.

Such a solution, having a relatively compact form with reduced friction, ensures non-return whilst avoiding any reduction.

Therefore, a ratio of 1:1 will easily be obtained between the pivoting of the steering wheel 3 and the pivoting of the second input 15.

Figure 4:
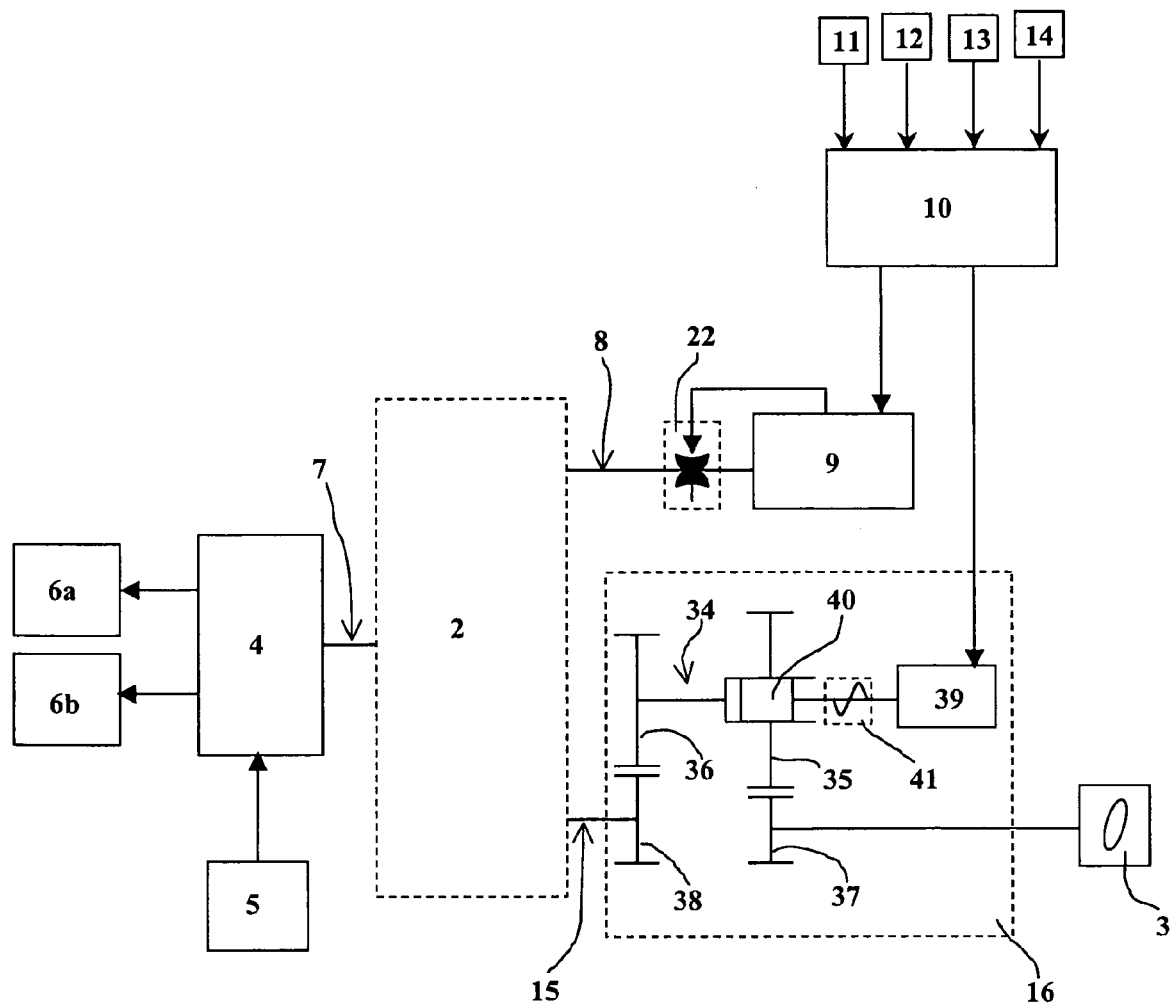
FIG. 4 is a simplified diagram of a third embodiment of the invention.

FIG. 4 lastly shows a third embodiment in which the non-return means comprise a transfer gearbox 16 enclosing a comprising an idler shaft 34 with two pinions. A first pinion 35 is coupled with the steering wheel 3 and the second pinion 36 is coupled with the second input 15 of the differential 2.

To ensure these couplings, the steering wheel 3 is linked to an input gear 37 that cooperates with the first pinion 35 and the second input 15 has a gear 38 that cooperates with the second pinion 36.

The reduction ratio of this transfer gearbox 16 is chosen here as approximately 1:1. This may be modified and adapted according to the reduction required on the steering wheel.

The idler shaft 34 is furthermore coupled with a counter-torque motor 39 that is activated by the control computer 10.

The computer 10 is appropriately programmed to enable it to determine which torque value must be applied to the idler shaft 34 by the motor 39 to compensate for the parasite torque caused by the turn correction motor 9.

The counter-torque motor 9 thereby ensures, to some extent, the irreversibility of the link between the steering wheel 3 and the second input 15.

The counter-torque motor 39 is linked to the idler shaft 34 by means of damping means 40, for example a torque bar. Such an arrangement enables the shocks coming from the second input 15 towards the steering wheel 3 to be damped, to some extent, (or even blocked). It is also possible for the torque bar 40 (or another torque bar) to be positioned between shaft 34 and pinion 35. The torque bar absorbs the torque feedback from the second input 15, thereby minimizing the motor 39.

Lastly, safety means 41 are provided between the motor 30 and the idler shaft 34. These means will be constituted, for example, by a coupler having a resistance calibrated at a given maximal torque.

Thus, should the counter-torque motor 39 become blocked, it would be possible (by acting on the steering wheel 3) to ensure a rupture in the link 41 between the motor 39 and the idler shaft. The steering wheel 3 would then no longer be blocked by the counter-torque motor 39 and it would remain possible for the vehicle to be piloted despite this electric failure.

The invention claimed is:

1. A control device for an active steering of a vehicle comprising a driving differential that is positioned between a steering wheel and steering control means, said differential which furthermore receives at a first input a counter-steering command supplied by a turn correction motor, wherein said steering wheel is linked to a second input of said differential by non-return means preventing any force feedback from said differential to said steering wheel.

2. The control device according to claim 1, wherein said non-return means comprise a system with a pinion and a worm positioned between said steering wheel and said second input of said differential.

3. The control device according to claim 1, wherein said non-return means comprise a screw-nut system coupled with a rotary/linear motion converter.

4. The control device according to claim 3, wherein the rotary/linear motion converter is a crank-connecting rod system.

5. The control device according to claim 1, wherein said non-return means comprise a transfer gearbox comprising an idler shaft with two pinions, a first pinion being coupled with said steering wheel and said second pinion being coupled with said second differential input, said idler shaft being able to be activated additionally by a counter-torque motor activated by said control computer.

6. The control device according to claim 5, wherein said counter-torque motor is linked to said idler shaft by means of damping means.

7. The control device according to claim 1, wherein said device comprises power cut braking means positioned between said first input and said turn correction motor.

* * * * *